United States Patent
Beausoleil et al.

(10) Patent No.: US 7,310,623 B2
(45) Date of Patent: Dec. 18, 2007

(54) GAMES USING PAIR-WISE ENTANGLEMENTS

(75) Inventors: Raymond G. Beausoleil, Redmond, WA (US); Kay-Yut Chen, Santa Clara, CA (US); Tad Hogg, Mountain View, CA (US); Li Zhang, Mountain View, CA (US); William J. Munro, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 10/734,713

(22) Filed: Dec. 12, 2003

(65) Prior Publication Data

US 2005/0131746 A1   Jun. 16, 2005

(51) Int. Cl.
   *G06E 1/00*     (2006.01)
(52) U.S. Cl. .............................. 706/15; 257/9; 977/755; 977/762
(58) Field of Classification Search ................. 706/15; 257/9; 977/755, 762
   See application file for complete search history.

(56) References Cited

U.S. PATENT DOCUMENTS

| | | | | |
|---|---|---|---|---|
| 5,327,270 A | * | 7/1994 | Miyatake ...................... | 349/9 |
| 6,578,018 B1 | * | 6/2003 | Ulyanov ...................... | 706/14 |
| 6,864,501 B2 | * | 3/2005 | Shields et al. ................ | 257/13 |
| 6,897,434 B1 | * | 5/2005 | Kumar et al. ........... | 250/227.18 |
| 6,989,523 B2 | * | 1/2006 | Beausoleil et al. ....... | 250/214.1 |
| 2005/0036624 A1 | * | 2/2005 | Kent et al. .................. | 380/277 |
| 2005/0094142 A1 | * | 5/2005 | Takeuchi ..................... | 356/364 |

OTHER PUBLICATIONS

"Quantum Strategies", D. A. Meyer, Physical Review Letters, vol. 82, No. 5, Feb. 1, 1999.*
"Experimental Demonstration of Direct Secure Communication with 2-Qubit States", Schulz, O.; Beige, A.; Englert, B.-G.; Kurtsiefer, C.; Weinfurter, H., p. 423, Quantum Electronics Conference, 2003. EQEC '03. European, Jun. 22-27, 2003.*
"Towards Characterizing the Non-Locality of Entangled Quantum States", Renner, R.; Wolf, S.; Information Theory, 2003. Proceedings. IEEE International Symposium on, Jun. 29-Jul. 4, 2003 p. 428.*
"The Impossibility of Pseudo-Telepathy without Quantum Entanglement", V. Galliard, A. Tapp, S. Wolf, Information Theory, 2003. Proceedings. IEEE International Symposium on, Jun. 29-Jul. 4, 2003 p. 457.*
"Quantum Strategies in Noncooperative Games", G. B. Dahl, S. E. Landsburg, University of Rochester.*
"Experimental Implementation of a Quantum Game", Carsten Schuck, Quantum Electronics Conference, 2003, EQEC 03. European, xqp.physik.uni-muenchen.de.*

(Continued)

*Primary Examiner*—David Vincent
*Assistant Examiner*—Mai T Tran

(57) ABSTRACT

A quantum approach to the economically significant n-player public goods or similar n-player game requires only two-particle entanglement and is thus much easier to implement than games requiring n-particle entanglements. Two-particle entanglements are sufficient to give near optimal expected payoff when players use a simple mixed strategy for which no player can benefit by making different choices. This mechanism can also address some heterogeneous preferences among the players. Quantum games in accordance with the invention can be simulated on classical computers without requiring impractical amounts of processing power for large numbers of players.

23 Claims, 3 Drawing Sheets

OTHER PUBLICATIONS

"Cooperative three- and four-player quantum games", Y. J. Ma, G. L. Long, F. G. Deng, F. Li, S. X. Zhang, Physics Letters A, 301, Issue 3-4, pp. 117-124 (Aug. 26, 2002).*

"Entanglement enhanced multiplayer quantum games", Du, Jiangfeng; Li, Hui; Xu, Xiaodong; Zhou, Xianyi; Han, Rongdian, Physics Letters A 302, issues 5-6, pp. 229-233 (Sep. 30, 2002).*

Benson, Oliver et al., "Regulated and Entangled Photons from a Single Quantum Dot," Physical Review letters, vol. 84, No. 11, pp. 2513-2516 (Mar. 13, 2000).

Bouwmeester, Dik et al., "Observation of Three-Photon Greenberger-Home-Zeilinger Entanglement," Physical Review Letters, vol. 82, No. 7, pp. 1345-1349 (Feb. 15, 1999).

Chen, Kay-Yut et al., "A Quantum Treatment of Public Goods Economics," Quantum Information Processing, vol. 1, No. 6, pp. 449-469 (Dec. 2002).

Kwiat, Paul G. et al., "Ultrabright Source of Polarization-entangled Photons," Physical Review A, vol. 60, No. 2, pp. R 773-776 (Aug. 1999).

O'Brien, J.L. et al., "Demonstration of an all-optical quantum-controlled-NOT gate," Nature, vol. 426, pp. 264-267 (Nov. 20, 2003).

Pan, Jian-Wei et al., "Experimental Demonstration of Four-Photon Entanglement and High-Fidelity Teleportation," Physical Review Letters, vol. 86, No. 20 (May 14, 2001).

Pan, Jian-Wei et al., "Entanglement purification for Quantum Communication," Nature, vol. 410, pp. 1067-1070 (Apr. 26, 2001).

Tanzilli, S. et al., "Highly efficient photon-pair source using periodically poled lithium niobate waveguide," Electronics Letters, vol. 37, No. 1 (Jan. 4, 2001).

Pittman, T.B. et al., "Probablistic quantum logic operations using polarizing beam splitters," Physical Review A, vol. 64, pp. 062311-1 to 062311-9 (2001).

Pittman, T.B. et al., "Experimental controlled-NOT logic gate for single photons in the coincidence basis," Physical Review A, vol. 68, pp. 032316-1 to 032316-4 (2003).

Zhang et al., "Reduced Entanglements for Quantum Games," pp. 1-27 (Jul. 31, 2003).

Benjamin, S. C. et al—"Multiplayer Quantum Games"—Physical Review A—vol. 64 No. 030301—Aug. 13, 2001.

Huberman, B. A. et al—"Quantum Solution of Coordination Problems"—Online!—Jun. 12, 2003.

Du, J et al—"Entanglement Enhanced Multiplayer Quantum Games"—Physics Letters A—vol. 302 No. 5-6—Sep. 30, 2002—pp. 229-233.

Akihisa, Tomita—"Complete Bell State Measurement With Controlled Photon Absorption And Quantum Interface"—Online!—Jun. 21, 2000.

Singh, S. K.—"Characterizing The Combinatorics Of Distributed EPR Pairs For Multi-Partite Entanglement"—Online!—Jan. 1, 2004.

\* cited by examiner

GAMES USING PAIR-WISE ENTANGLEMENTS

BACKGROUND

Quantum information processing provides a variety of new capabilities with potentially significant performance improvements over classical information processing. One example of quantum information processing is quantum computation, which can potentially solve problems that appear to be intractable using classical computers. Another application of quantum information processing is quantum cryptography that permits secure communication or exchange of keys over a distance. Yet another application of quantum information processing is quantum games, which can extend classical games such as the Prisoner's dilemma and the n-player minority game into the quantum realm to broaden the range of available game strategies.

One well-studied classical game is the public goods game, which describes social choice problems involved in provisioning for public goods. A typical example of a public goods game arises for a group deciding whether to provide a common or public good, such as a park. The well-known free rider problem arises in such classical games when the best individual result is to avoid contributing to the purchase of a public good but to free ride on the benefits of the public good purchased by others. However, if too many players are free riders, the public good is not purchased. The free rider problem arises from the individual rational decisions of players to free ride resulting in the group as a whole being worse off than if all players had contributed.

The free rider problem can be solved either by using a third party to enforce agreements or by a repeated game scenario in which participants can self-police. Government can be a good solution to the free rider problem for a public good such as national defense that involves a large population, but government may be inefficient for public goods in a smaller group such as a neighborhood. Provision of these smaller scale public goods often relies on altruism and other weaker incentives to prevent free riders. Typically, contributions to these public goods are not at efficient levels.

SUMMARY

In accordance with an aspect of the invention, a game such as the public goods game can be expanded to include quantum properties that give players additional choices and provide a more economically efficient result. In one embodiment of the invention, a game includes constructing a state vector representing N pairs of entangled qubits and selecting 2N operators to be respectively applied to the 2N qubits. Each of n players of the game can select one or more of the 2N operators, where the operators that a player selects correspond to a set of the qubits that are assigned to the player. Each operator can then be applied to only a portion of the state vector that represents the qubit corresponding to the operator. Results, which are respectively assigned to the players of the game, can then be determined from a final state vector arising from the application of the 2N operators to the initial state vector. In one embodiment of the invention, the state vector is constructed by placing a physical system such as a collection of entangled photon pairs in a quantum state corresponding to the state vector, and the operators are implemented through manipulation of the physical system. Alternatively, the state vector and the operators can be constructed and implemented through software executed in a classical computer.

BRIEF DESCRIPTION OF THE DRAWINGS

Use of the same reference symbols in different figures indicates similar or identical items.

DETAILED DESCRIPTION

Figure 1:
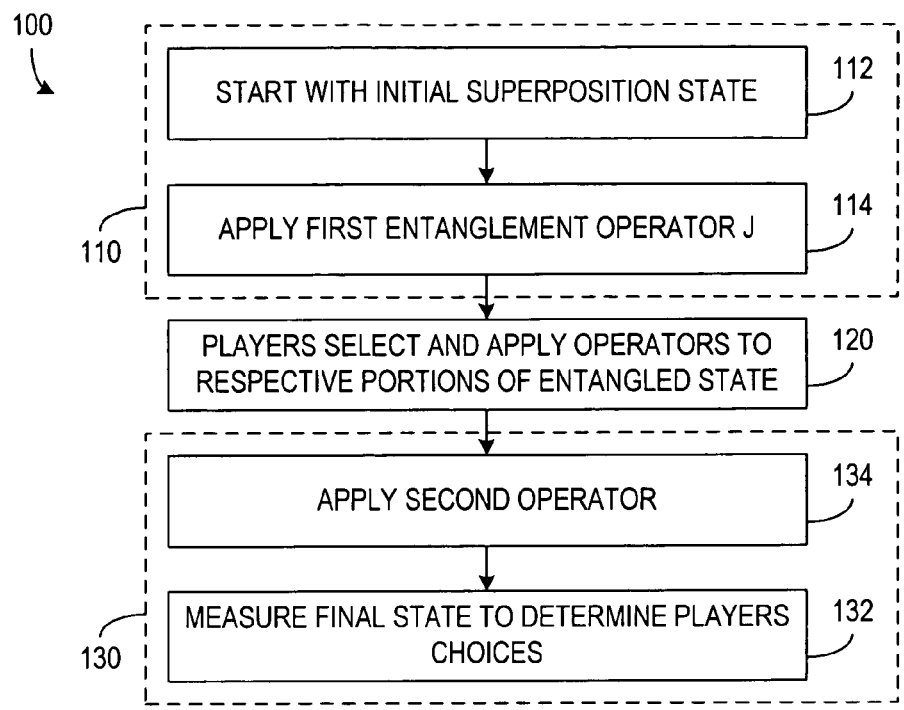
FIG. 1 is a flow diagram of a quantum game in accordance with an embodiment of the invention.

In accordance with an aspect of the invention, game strategies that apply quantum operators to portions of entangled quantum states address economic problems such as the freerider problem without requiring a third party enforcer or game repetition. With a suitable implementation, simple mixed strategies almost entirely avoid the free rider problem in the context of the public goods game and give expected performance close to a theoretically efficient value when the number of players is large.

In accordance with a further aspect of the invention, an implementation of a quantum game such as the quantum public goods game begins with or employs only pair-wise entanglement of quantum states (e.g., entangled photon pairs). Use of only pair-wise entangled states avoids significant implementation challenges that commonly arise when trying to create and use n-way entangled states.

An exemplary embodiment of the invention is an n-player quantum game, which can be generalized from a classical game. A classical game is mathematically described by sets of choices available to the players and an associated payoff to each player based on the choices. In a particular game, each player k makes a choice $S_k$, which is selected from the set S of available choices. A set s of all of choices, i.e., $s=\{s_1, \ldots, s_n\}$, that the players made in a game uniquely defines the game, and for each player k, the payoff $P_k(s)$ is a function of the set s of choices made by all n players.

One way to generalize a classical game to a quantum game associates each player k with a quantum state $|S_k\rangle$ that is subject to the manipulation or choice of player k. A superposition state $\Sigma_s \psi_s |s\rangle$, which by definition is equal to $\Sigma_s \psi_s |s_1, \ldots, s_n\rangle$ and to $\Sigma_s \psi_s |s_1\rangle X \ldots X |s_n\rangle$, where the sum is over all possible sets s, uniquely defines the results of a particular playing of the quantum game. This quantum version of the classical game starts by creating an initial superposition state (e.g., $\Sigma_s IV_s |s\rangle$) that is known to all players. Each player k is then allowed to operate only on the part of the superposition state that is associated with that player. After all players perform their chosen operations, a joint operation that is fixed and known to all players can be performed. An interpretation rule known to all players is applied to the final superposition state (e.g., $\Sigma_s \psi_s |s\rangle$) to produce a definite choice or result for each player.

For the quantum game to be a direct generalization of the original game, the player's operations should include choices that correspond to the original choices in the classical game. That is, some available operations on the superposition state should reproduce the payoff structure of the classical game if all players restrict their individual operations to just those corresponding to the actions allowed in the classical game.

In one embodiment of the public goods game, the state $|s_k\rangle$ for player k corresponds to one or more qubits. Each qubit corresponding to a player k has one basis state (e.g., state$|0\rangle$) associated with an obligation of player k to contribute to purchase of the public good and another basis state (e.g., state$|1\rangle$) associated with player k not contributing to the public good. The classical game results if all players restrict their choices to the specific operators corresponding to the classical decisions to cooperate or defect. For example, in an exemplary embodiment of the invention, a cooperate operator and a defect operator, which act on a single qubit, are respectively the 2×2 identity matrix and the Pauli matrix $\sigma_x$. However, the quantum game gives each player further options, and each player's state$|s_k\rangle$ is entangled with the states of other players so that the final result of whether any player contributes or not depends on the operations of the other players. Generally, players do not directly set their outcome bits because the final outcome is determined from the players' chosen operators and a predetermined joint operator J', which combines choices from entangled players. If a player sets a qubit directly (e.g., by substituting a new photon for the entangled one sent to the player), then the result is a 50-50 chance for a 0 or 1, for both players.

FIG. 1 is a flow diagram of a quantum game 100 in accordance with an embodiment of the invention. Quantum game 100 may be played by a set of players that have agreed to be bound to a decision corresponding to the results of game 100. For example, in the public goods game, each player in a group deciding whether to purchase a public good can agree to be bound to contribute depending on the results of the game.

Quantum game 100 starts in step 110 with the creation of an entangled state known to all players. Generally, multiple repetitions of the initial entangled state are created to permit subsequent measurements of the probabilities during interpretation of the games result. For example, the entangled state created in step 110 can be the state of a physical system representing entangled qubits, and step 110 can create multiple independent copies of the system, all of which are in the same entangled state.

In an exemplary embodiment of game 100, creating the entangled state starts in step 112 with an initial state V. State V can be an entangled state or an unentangled state and in particular can be a state that is relatively easy to create such as a product of photon states. A step 114 applies an entanglement operator J to state V to create a specific initial entangled state JV. The entanglement operator J preferably commutes with the classical single-player operators. In the simplest case, the entanglement operator J is the unity operator, which corresponds to skipping step 114. Generally, application of operator J is not required if state V is already a suitably entangled state.

In step 120, each player k selects an operator $U_k$ to apply to the player's part of the entangled state (e.g., to entangled state JV in the exemplary embodiment of quantum game 100). In the exemplary embodiment of game 100, step 120 generates a state V', which is equal to $(U_1 \hat{X} \ldots \hat{X} U_n)$JV.

Step 130 then evaluates the entangled state $(U_1 \hat{X} \ldots \hat{X} U_n)$JV to determine definite results for the players. Step 130 can include an optional step 134 that applies to state V' a second operator J' that is known to all players. If step 134 is skipped, the players may be tempted to set their bits to "defect" by replacing their entangled photon with a new one. Accordingly, applying operator J' in step 134 can improve game security by making improper tampering unsuccessful at avoiding contribution. In an exemplary embodiment, the second operator J' is the inverse $J^\dagger$ of the entanglement operator J and operates to unentangle state V', giving the final state $\psi$ that is equal to $J^\dagger V'$. For a given game, i.e., specific choices for initial state V and operators J and J', the final state $\psi$ is a function $\psi(U_1, \ldots, U_n)$ of the players' choices of operators $U_1, \ldots, U_n$.

Step 132 measures the final state $\psi$ and determines a specific value for each player's choice or result. The probability of a measurement yielding a set of choices s (i.e., particular assignments of 0 or 1 to the players' qubits) is $|\psi_s|^2$. Accordingly, if a sufficient number of states JV are created and manipulated in parallel, the resulting repetitions of state $\psi$ can be measured to determine $|\psi_s|^2$. A fixed rule for interpreting such measurements to select a definite set s of choices or results for the players can be defined in a variety of ways as described further below.

The choice of the entangled state V or JV determines the type and amount of entanglement among the players. The commutation condition on J ensures that if each player k selects an operator $U_k$ corresponding to one of the choices in the original game, the final result of the quantum game will, with probability 1, reproduce those choices.

A variety of different systems have been proposed for qubits used in quantum information processing and could be used to implement a quantum game. Some examples of such quantum systems include: charge or flux in superconducting quantum interference devices (SQUIDs); liquid or solid-state NMR systems; individual atoms, molecules, or ions in traps or otherwise; cavity quantum electro-dynamic (QED) systems; and photonic systems to name a few. Players using a system implementing a quantum game could travel or send instructions using conventional communication to a site where the physical quantum systems implement the required entanglements of quantum states. Alternatively, use of entangled photons, which can be separated and transmitted for relatively long distances over an optical network, provides secure communications and permits separation of the components of a quantum game system.

Figure 2:
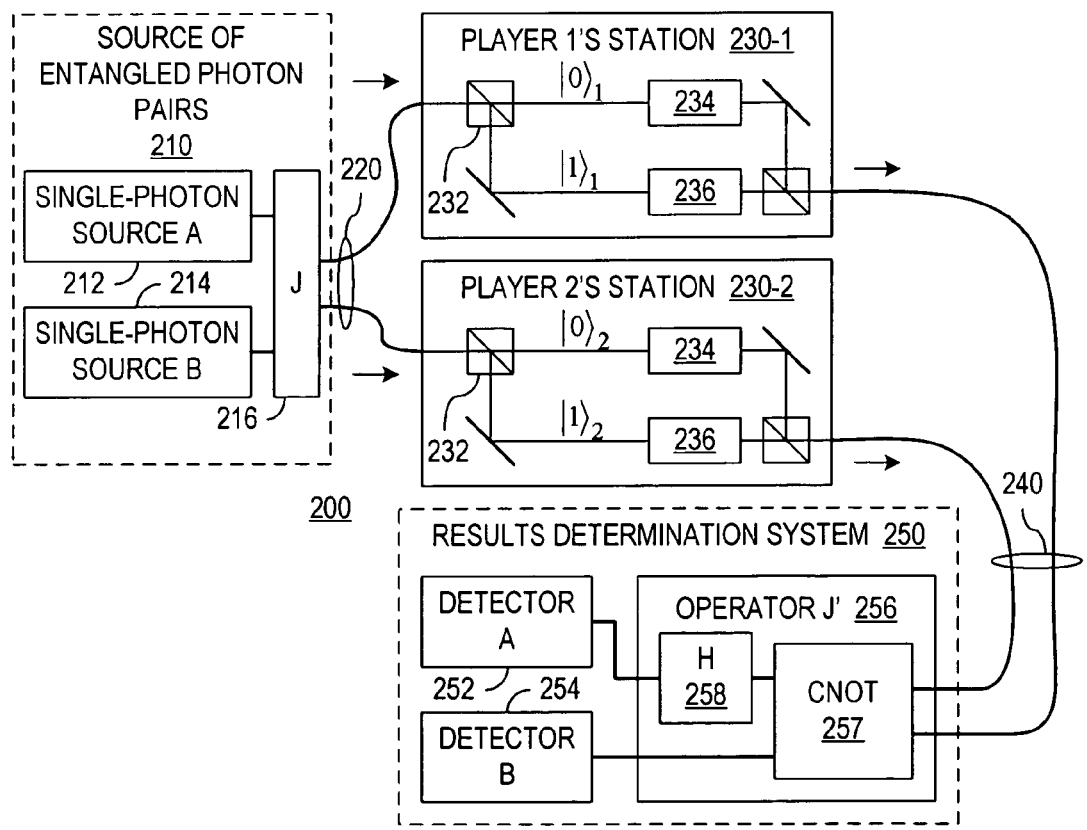
FIG. 2 is a block diagram of a system implementing a 2-player quantum game in accordance with an embodiment of the invention.

FIG. 2 is a block diagram of a 2-player quantum game system 200 employing states $|s_1\rangle$ and $|s_2\rangle$ that are photon states. Each photon state $|s_1\rangle$ or $|s_2\rangle$ encodes a qubit using the orthogonal polarization states (e.g., horizontal and vertical linear polarizations) to distinguish the basis states $|0\rangle_1$ and $|1\rangle_1$ or $|0\rangle_2$ and $|1\rangle_2$ of the qubits. Alternatively, qubits could be implemented using other physical systems as described above.

System 200 includes a photon source 210, a first optical network 220, player stations 230-1 and 230-2, a second optical network 240, and a results determination system 250. Photon source 210 produces photon pairs that are in entangled quantum states. From each entangled pair of photons, optical network 220 delivers one photon to a player station 230-1 and delivers the other photon to player station 230-2. (Player stations 230-1 and 230-2 can be substantially identical and are sometimes generically referred to herein as stations 230.) Players at stations 230-1 and 230-2 perform player-selected operations on respective qubit/photon states, and the modified states are transmitted via optical fiber network 240 to results determination system 250. p In the illustrated embodiment, source 210 creates entangled photons using photons from separate single-photon sources 212 and 214 and an optical system 216 that entangles the photon states. Optical system 216 can be a CNOT gate, for example, that converts an appropriate two-photon product state V (e.g., state $\{|0\rangle_1+|1\rangle_1\}+|0\rangle_2$) into an entangled state (e.g., state $|0\rangle_1|0\rangle_2+|1\rangle_1|1\rangle_2$). O'Brien et al., "Demonstration of an All-Optical Quantum Controlled-NOT Gate," Nature, Vol. 426, pp. 264-267 (2003) describes an optical system implementing a CNOT gate for qubits represented using photon polarization states. A CNOT gate can also be implemented using non-linear optical systems. For example, U.S. Pat. application Ser. No. 10/364,987, entitled "Quantum Information Processing Using Electromagnetically Induced Transparency" describes use of electromagnetically induced transparency (EIT) to create quantum gates such as a CNOT gate.

In another embodiment, source 210 directly produces polarization-entangled photon pairs. An electrically-triggered semiconductor device, such as described by Benson et al., "Regulated and Entangled Photons from a Single Quantum Dot," Physical Review Letters, Vol. 84, No. 11, pp. 2513-2516 (2000), provides a clean mechanism for producing entangled photon pairs. Alternatively, a bright source of entangled photon pairs uses an argon-ion laser and parametric down-conversion in BBO crystals. P. G. Kwiat et al., "High-efficiency, Quantum Interrogation Measurements via the Quantum Zeno Effect," Physical Review Letters, Vol. 83, pp. 4725-4728 (1999) describes one such source of entangled photon pairs. Entangled photon pairs could also be generated in a compact all-solid-state system using down-conversion of single photons in periodically-poled lithium niobate waveguides. See, for example, S. Tanzilli et al., "Highly Efficient Photon-Pair Source Using Periodically Poled Lithium Niobate Waveguide," Electronics Letters, Vol. 37(1), pp. 27-28, (2001). If necessary, conventional optical elements can separate entangled pairs from photons that are not part of an entangled state, and Jian-Wei Pan et al., "Entanglement Purification for Quantum Communication," Nature, 410:1067-1070, (2001), for example, describes purification of entangled photons using high quality linear optics.

Equation 1 represents an example of an entangled state JV of a photon pair from source 210. In Equation 1, states $|0\rangle_1$ and $|1\rangle_1$ are orthogonal polarization states of a photon directed to station 230-1, and states $|0\rangle_2$ and $|1\rangle_2$ are orthogonal polarization states of a photon directed to station 230-2.

$$\text{Equation (1)}: JV = \frac{(|0\rangle_1|0\rangle_2 + |1\rangle_1|2\rangle_2)}{\sqrt{2}}$$

Stations 230-1 and 230-2 permit respective players to apply operations to their respective photons. The operations can be implemented using conventional optical elements. Phase plates, for example, can transform or rotate the polarizations of the photons. A classical computer executing suitable software can control optical elements in each station 230 to provide the players with a user-friendly interface that allows the players to select their strategies. The physical manipulations of optical elements or the entangled state can therefore be transparent to the players.

Station 230-1 in the illustrated embodiment of FIG. 2 contains a polarizing beam splitter 232 that directs photons in polarization state $|0\rangle_1$ into a polarization changing element 234 and directs photons in polarization state $|1\rangle_1$ into a polarization changing element 236. In an exemplary embodiment, each element 234 or 236 includes two quarter-wave plates and a half-wave plate in mounts that can be adjusted to produce any desired rotation of photon polarizations. A player can operate polarization changing elements 234 and 236 to separately change photons in the states $|0\rangle_1$ and $|1\rangle_1$ (e.g., to rotate their polarizations) before output from station 230-1. This configuration allows player 1 to apply a player-selected, unitary transformation $U_1$ to player 1's qubit. Station 230-2 can be constructed in the same manner as station 230-1 to give player 2 the ability to perform an arbitrary unitary transformation $U_2$ on player 2's qubit.

When the input entangled state JV has the form of Equation 1, each photon in state $|0\rangle_1$ is paired with a photon in state $|0\rangle_2$, and each photon in state $|1\rangle_1$ is paired with a photon in state $|1\rangle_2$. Accordingly, the polarization changes of element 232 of station 230-1 on a photon in state $|0\rangle_1$ will have a measured effect if the paired photon is measured to be in state $|0\rangle_2$. If the paired photon is measured to be in state $|1\rangle_2$, the polarization changes of element 234 in station 230-1 will have a measured effect on state $|1\rangle_1$. Each player can thus select conditional strategies that depend on what the other player does.

Results determination system 250 in the exemplary embodiment of the invention measures the photons corresponding to the photon states $|0\rangle_1$, $|1\rangle_1$, $|0\rangle_2$, and $|1\rangle_2$. In the illustrated embodiment, an optical system 256 performs an operation J' on the manipulated state (e.g., $V'=U_1U_2JV$) to produce the final state ψ that detectors 252 and 254 measure. In an exemplary embodiment, operation J' is the inverse of the operation J. Alternatively, operation J' changes the manipulated state V' in a manner that demonstrates quantum coherence between state V' and the initial state V. In this manner, measurement of the final state ψ can identify whether a player improperly manipulated a portion of the wave function (e.g., by blocking entangled photons and transmitting a desired polarization state.) Additionally, joint operation J' ensures that the outcome for each player depends also on what the other players do. If one player uses the "defect" operator, the other entangled player using a different (non-classical) operation could ensure that the defecting player actually ends up contributing.

Optical system 256 in FIG. 2 is a Bell state analyzer and includes a CNOT gate 257 and a Hadamard gate 258. CNOT gate 257 can be implemented using linear or non-linear optics as described above. Hadamard gate 258 performs a linear operation that for polarization basis of photonic qubits is a π/4 rotation of the polarization direction of the photon that controls the CNOT gate. The Bell state analyzer undoes the entanglement of the qubits/photons allowing the independent measurements of two photons. Otherwise, measurement of one entangled photon would force the other entangled photon into a definite state.

Each detector 252 or 254 can be implemented with a polarizing beam splitter that separates states $|0\rangle_1$ and $|1\rangle_1$ or $|0\rangle_2$ and $|1\rangle_2$ and measures photons corresponding polarization states, for example, by detecting single photons, counting the photons, or measuring an intensity of light resulting from each state. Optionally, a non-destructive detector such as described in U.S. patent application Ser. No. 10/678,437, entitled "Detecting One Or More Photons From Their Interactions With Probe Photons In A Matter System" can measure the numbers of photons and permit further use of the photons after the measurement. Alternatively, conventional photodiodes can measure the intensity of light for each polarization state. If system 200 provides a sufficient flux of entangled photon pairs to determination system 250, the intensity of photons with a polarization corresponding to state $|>_1$, $|1>_1$, $|0>_2$, or $|1>_2$ directly indicates the probability of the final state $\psi$ containing photons in state $|0>_1$, $|1>_1$, $|0>_2$, or $|1>_2$. Alternatively, system 250 could implement quantum state tomography (QST) that allows complete reconstruction of the final quantum state.

In the public goods game, the players can agree beforehand to be obligated (or not) to contribute to the purchase of the public good depending on the polarization measurement results. A variety of contribution determination rules based on the measured intensities are possible. For example, a player could be obligated to contribute a fixed share if the intensity of the polarization corresponding to the state (e.g., $|0>_1$ or $|0>_2$) associated with the choice to contribute is greater than the intensity for the other state. With this rule, player 1 (or 2) will be obligated to contribute only if the measured intensity of photons with the polarization corresponding to state $|0>_1$ (or $|0>_2$) is greater than the measured intensity of photons with the polarization corresponding to state $|1>_1$ (or $|1>_2$). Alternatively, a player 1 (or 2) can be obligated to contribute if the intensity of photons corresponding to state $|0>_1$ (or $|0>_2$) is above some threshold intensity, e.g., sufficiently above the background noise level.

A generalization of a 2-player game system to an n-player game system provides greater utility. In principle, a maximally entangled n-photon state (e.g., $\{|0>_1|0>_2 \ldots |0>_n + |1>_1|1>_2 \ldots |1>_n\}/\sqrt{2}$) can be constructed from entangled two-photon states. See Dik Bouwmeester et al., "Observation of Three-Photon Greenberger-Horne-Zeilinger Entanglement," Physical Review Letters, Vol. 82, pp. 1345-1349, (1999), and Jian-Wei Pan et al., "Experimental Demonstration of Four-Photon Entanglement and High-Fidelity Teleportation," Physical Review Letters, Vol. 86, 4435-4438 (2000). However, scaling a fully entangled game from 2 to n players can be nontrivial even when using linear optics. For example, if the states of two photons for any two players remain coherent with probability $\beta$ (incorporating the net efficiency with which entanglement can be created, distributed, purified, manipulated, and detected), the mean number of trials (or entangled photon pairs) needed to successfully register a mutual choice between two players is $1/\beta$. Because an accidental (or deliberately disruptive) measurement of a single photon in the n-photon maximally entangled state destroys the entire state, making n photons useless, the number of initial entangled states needed to complete a maximally-entangled game for n players may scale no better than about $(1/\beta)^n$.

In accordance with an aspect of the invention, an implementation of an n-player game distributes entangled two-particle states between either all pairs of players or selected pairs of players. In these cases, a measurement of a photon disrupts only one two-photon state. The mean number of trials needed to complete the games described further below thus scales as either $n(n-1)/2\beta$ or $n/\beta$, making the pair-wise games easier to implement for a large number of players.

Figure 3:
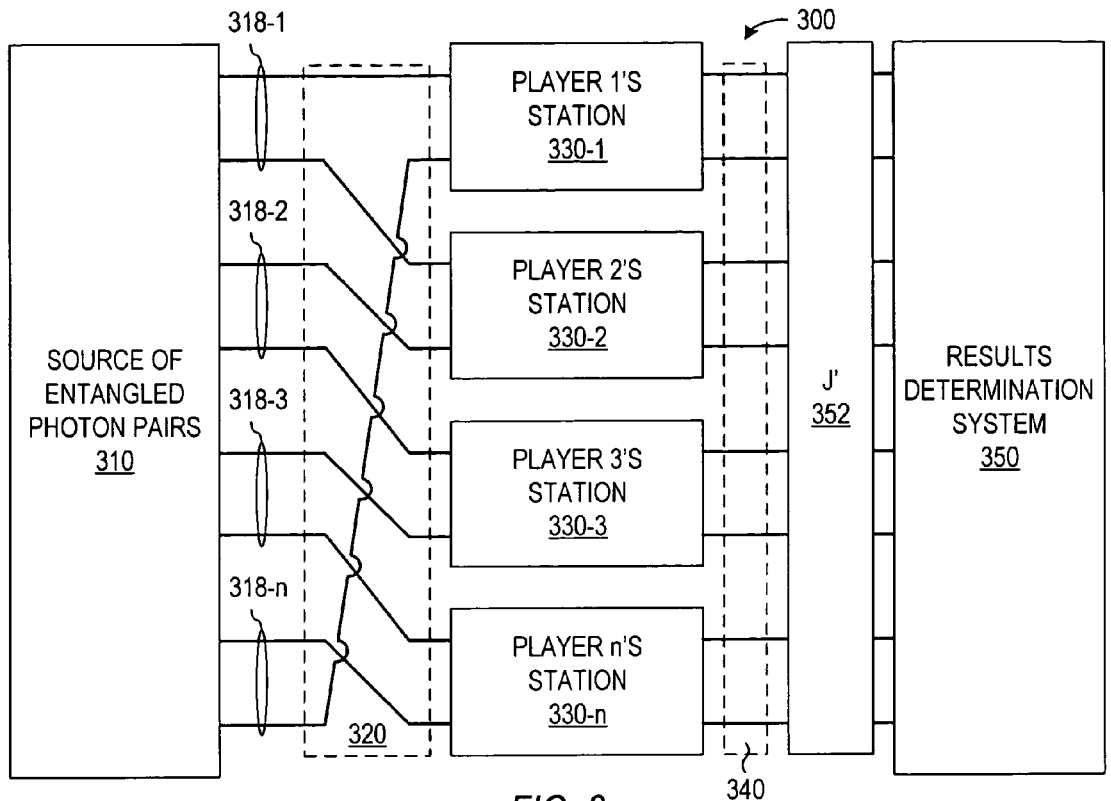
FIG. 3 is a block diagram of a system implementing an n-player quantum game in accordance with an embodiment of the invention using pair-wise entangled states for neighboring players.

FIG. 3 illustrates a system 300 for implementing an n-player quantum game. System 300 includes a source 310 of n separate channels 318-1 to 318-n of entangled photon pairs. Each channel 318 corresponds to a pair of neighboring stations 330. Each entangled photon pair in a channel includes spatially separated photons including one photon that an optical fiber network 320 sends to a first station (e.g., station 330-1 to 330-n) corresponding to the channel and another photon that optical fiber network 320 sends to a second station (e.g., 330-2, 330-3, . . . 330-n, 330-1) corresponding to the channel. Accordingly, each player has two channels that are respectively shared with two neighboring players. Here, the players and the stations 330 are neighboring in the sense that they each use respective photons from shared entangled pairs of photons.

An optional photonic entanglement system (not shown) can perform a fixed operation J on the paired photons before optical network 320 delivers the photons to respective stations 330. The entanglement system can be omitted if source 310 produces suitably entangled photon pairs.

Each of stations 330-1 to 330-n, which are sometimes referred to herein generically as stations 330, permits an assigned player to choose and apply separate operations to the two qubits corresponding to that player. In an exemplary embodiment, each station 330 is implemented using two copies of the structure described above for stations 230 of FIG. 2, where each copy manipulates one of the two qubits assigned to the station 330.

An optical fiber network 340 transmits the photons having states that were operated on in stations 330 to a results determination system 350. Results determination system 350 includes a system 352 that performs a predetermined joint operation J' on the entangled photon pairs and detectors that measure the relative intensities of photons corresponding to the different states representing the players' qubits. Based on the measured intensities and a predefined contribution determination rule, system 350 assigns to each player a definite result, e.g., contribute or not to the public good.

The contribution determination rule for this n-player game can be based on intensity or probability measurements of two qubits per player. Again a variety of contribution determination rules are possible. For example, the sum of the intensities for two states (e.g., states $|0>$ for both qubits) for a player can be compared to a fixed threshold or to the intensities for the other two states (e.g., states $|1>$ for both qubits) to determine where the player must contribute a fixed amount. Alternatively, the contributions rule could assign an amount of contribution to each player depending on the measured intensities of particular states (e.g., states $|0>$ for both qubits) assigned to the player. For one rule of this type, some maximum contribution amount is pre-determined for the whole group, and the contribution of each player is directly proportional to the player's fraction of all qubits having the contribution state (e.g., state $|0>$)

Figure 4:
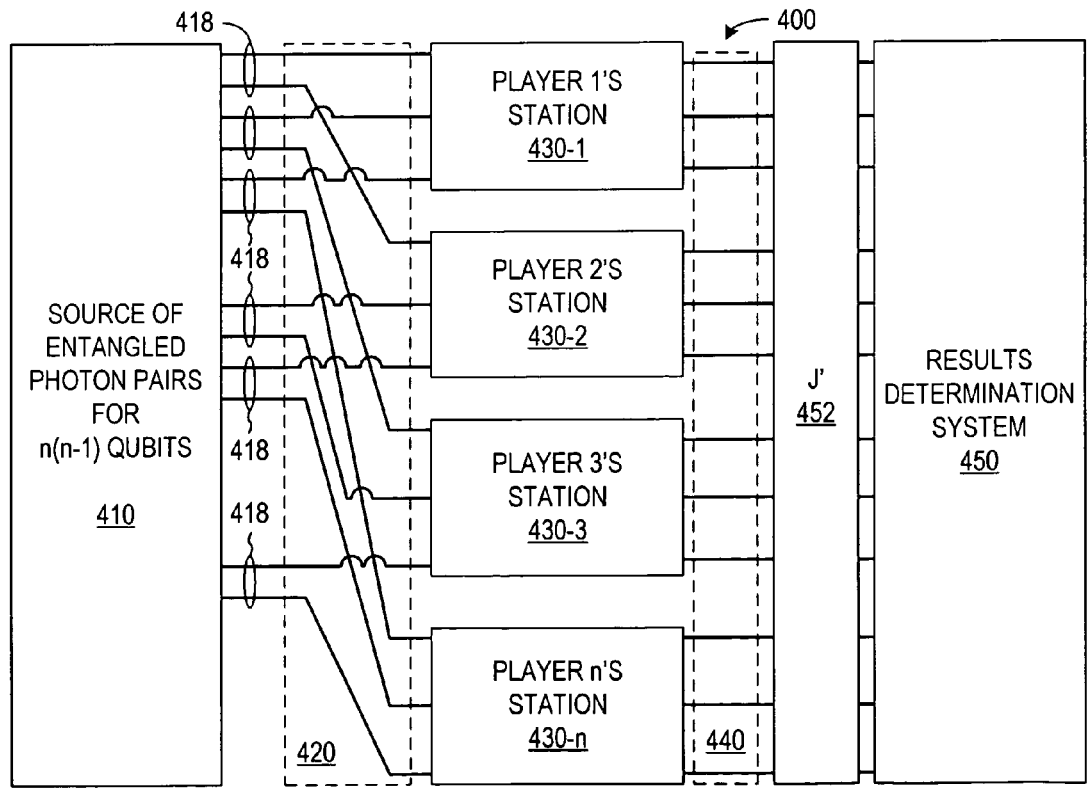
FIG. 4 is a block diagram of a system implementing an n-player quantum game implemented in accordance with an embodiment of the invention using pair-wise entangled states in accordance with an embodiment of the invention.

FIG. 4 illustrates another system 400 for implementing an n-player quantum game. System 400 includes a source 410 of $n(n-1)/2$ separate channels 418 of entangled photon pairs. Each channel 418 corresponds to an entangled pair of qubits for a pair of players. Each entangled photon pair in a channel 418 includes spatially separated photons including one photon that an optical fiber network 420 sends to a first station 430 corresponding to the channel and another photon that optical fiber network 420 sends to a second station 430 corresponding to the channel. Accordingly, each player has (n−1) channels that are respectively shared with the other (n−1) players, and system 400 associates (n−1) qubits with each player.

An optional entanglement system (not shown) can implement an entanglement operation J on the channels if source 410 does not provide suitably entangled photon states.

Each of stations 430-1 to 430-n, which are sometimes referred to herein generically as stations 430, permits an assigned player to choose and apply (n−1) separate unitary operations respectively to the (n−1) qubits corresponding to that player. Each station 430 can be implemented using (n−1) copies of the structure described above for the player stations 230 of FIG. 2, where each copy manipulates one of the (n−1) qubits assigned to the station 430.

An optical fiber network 440 transmits the photons having states that were operated on in stations 430 to a results determination system 450. Results determination system includes a system 452 that performs joint operation J' and detectors that measure the relative intensities of photons corresponding to the different states representing the players' qubits. Based on the measured intensities and a predefined determination rule, system 450 assigns a result of the game to each player. The contribution rule implemented in system 450 can be substantially the same as the rules described above in regard to FIG. 3 but can be based on the greater number of qubits measured in system 400.

System 400 differs from system 300 in the number of qubits required to implement the game. System 300 of FIG. 3 requires n entangled qubit pairs or 2n qubits, while system 400 of FIG. 4 requires n(n−1)/2 entangled qubit pairs or n(n−1) qubits. For a large number n of players, system 300 requires fewer qubits and less hardware to generate, propagate, manipulate, and measure the qubits. The smaller number of entanglements in system 300 limits the operations/strategies that players can employ but still allows for efficient resolution of games such as the public goods game.

One way to reduce the number of entangled photon pairs required for system 400 of FIG. 4 is to use in each channel 418 photon pairs that have a probability p of being entangled and a probability (1−p) of being in separable states. Players are not told which pairs are actually entangled. Among all n(n−1)/2 pairs of players, the expected number of entangled pairs is of order $O(pn^2)$. Choosing probability p to be log(n)/n reduces the number of entangled pairs to order O(n log n) but still maintains high expected performance (in terms of economic efficiency). L. Zhang and T. Hogg, "Reduced Entanglement for Quantum Games," Intl. J. of Quantum Information (IJQI) 1(3) 321-335 (September 2003) further describe using smaller numbers of entangled pairs.

Specific selections of the entangled quantum states, the allowed player selected operations, and the rule for conversion of the final quantum state to definite player choices can provide a game that allocates economic resources more efficiently than would the equivalent classical game. Chen et al., "A Quantum Treatment of Public Goods Economics", Quantum Information Processing 1(6):449-469 (December 2002), which is hereby incorporated by reference in its entirety, shows that either quantum game configuration when applied to the public goods game provides results close to the theoretically efficient economic levels. Generally, the above described quantum games have several mixed strategy equilibria, giving the same payoff to each player. This payoff is generally between the payoff found in the conventional game (where all players defect) and the ideal efficient payoff (when all cooperate).

In accordance with another aspect of the invention, the quantum games employing pair-wise entanglements can be practically implemented or simulated using classical computing systems. These classical implementations lack some of the security guarantees that can be achieved using quantum systems but have the same theoretical behaviors as the quantum implementation.

As described above, the initial state V and the final state $\Sigma_s \psi_s |s\rangle$ are linear combinations of product states $|s_1\rangle \times \ldots \times |s_n\rangle$. In a game where each state $|s_k\rangle$ has two basis states, each state V and $\psi_s$ can be mathematically represented as a state vector having $2^n$ components, and the operations (e.g., J, $U_1, \ldots, U_n$, J') can be represented by $2^n + 2^n$ matrices that operate on the state vectors through matrix multiplications. Accordingly, the processing power required in the general case simulating a quantum game grows exponentially with the number of players, e.g., $O(n2^n)$ for matrix multiplications even if sparse matrix techniques are employed. A classical implementation of a general n-particle entangled quantum game thus becomes impractical for a game containing a large number of players n.

A pair-wise entangled game can be practically implemented using classical computing because pair-wise operations (e.g., J, $U_1, \ldots, U_n$, J') can be implemented using smaller matrices. In particular, adopting a quantum algebra based on two-particle entanglements causes each pair of entangled qubits to be independent of the other pairs of entangled qubits. Multiplications can be limited to matrices having the size required for mathematical representation of two entangled qubits (i.e., to 4×4 matrices).

Figure 5:
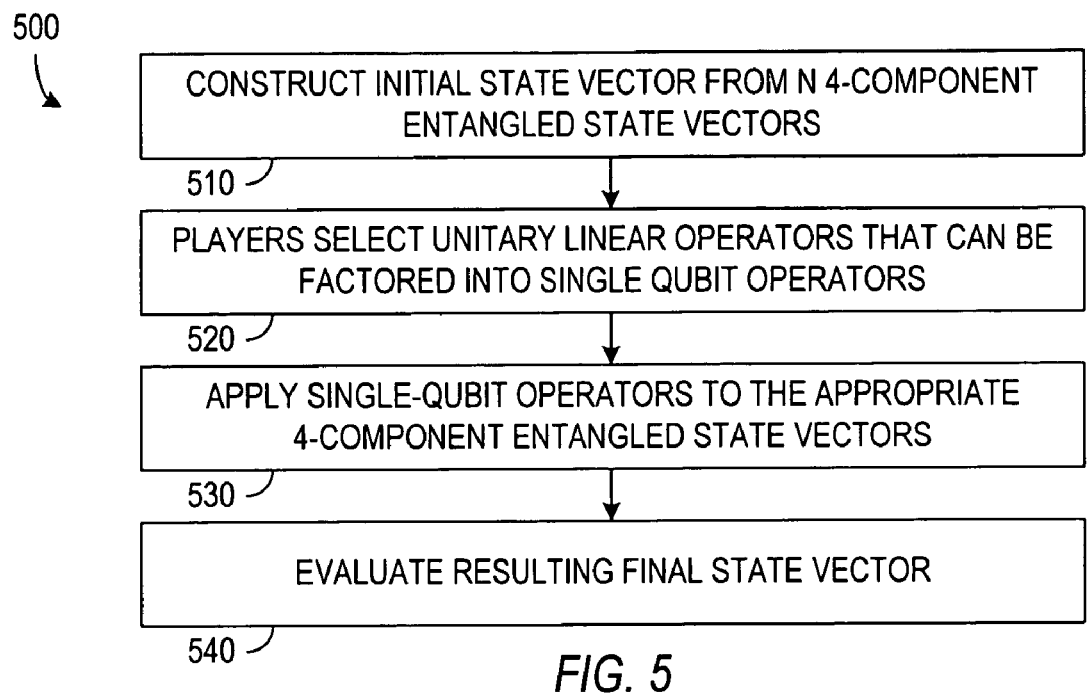
FIG. 5 is a flow diagram of a simulation of quantum game in accordance with an embodiment of the invention suitable for implementation on a classical computer.

FIG. 5 is a flow diagram of a process 500 using conventional computing to simulate a quantum game that is implemented as illustrated in FIG. 3 or 4. The quantum game uses N entangled qubit pairs, where N is equal to n or n(n−1) for the games of FIG. 3 or 4, respectively. Each entangled pair of qubits can be mathematically represented as a 4-component vector as in Equation 2. Further, since each entangled qubit pair is independent of the other entangled qubit pairs, an initial state vector Jv can be represented as a product of N 4-component vectors, where each 4-component vector corresponds to a different pair of entangled qubits. Process 500 begins in step 510 with constructions of a representation of the initial entangled state JV as a product of N 4-component vectors associated with the independent qubit pairs. The initial state will only require processing power to construct when the rules of the game are selected. After that, the initial state is a known quantity.

Equation 2: $|\alpha\rangle_{12} =$ $$\alpha_{00}|0\rangle_1|0\rangle_2 + \alpha_{01}|0\rangle_1|1\rangle_2 + \alpha_{10}|1\rangle_1|0\rangle_2 + \alpha_{11}|1\rangle_1|1\rangle_2 \equiv \begin{pmatrix} \alpha_{00} \\ \alpha_{01} \\ \alpha_{10} \\ \alpha_{11} \end{pmatrix}$$

The players in step 520 of process 500 select the unitary operators that are applied to their assigned qubits. In the game of FIG. 3, each player has two assigned qubits, and the operation $U_k$ selected by a player k can be factored into two unitary operations $U_{k1}$ and $U_{k2}$ with each operation $U_{k1}$ or $U_{k2}$ affecting a single qubit. In the game of FIG. 4, each player has N−1 assigned qubits, and the operation $U_k$ selected by a player k can be factored into N−1 unitary operations $U_{k1}$ to $U_{k(N-1)}$ with each of these operations affecting a single qubit.

Step 530 applies the single-qubit operators to the portion of the appropriate components of the initial state vector JV. In particular, each single-qubit unitary operator can be represented as a 4×4 matrix that affects only a four component state vector associated with the entangled pair including the qubit affected by the single-qubit unitary operation. For the entangled qubit state vector of Equation 2, the operator matrix has the form of Equation 3 or 4 depending on whether the operator transforms the first or second qubit in the entangled pair. In Equations 3 and 4, angles $\phi$, $\theta$, and $\alpha$ have values selected by a player in step 520.

Equation 3: $U_{ki} = \begin{pmatrix} e^{-i\phi}\cos\frac{\theta}{2} & e^{i\alpha}\sin\frac{\theta}{2} \\ -e^{-i\alpha}\sin\frac{\theta}{2} & e^{i\phi}\cos\frac{\theta}{2} \end{pmatrix} \otimes \begin{pmatrix} 1 & 0 \\ 0 & 1 \end{pmatrix} =$ $\begin{pmatrix} e^{-i\phi}\cos\frac{\theta}{2} & e^{i\alpha}\sin\frac{\theta}{2} & 0 & 0 \\ -e^{-i\alpha}\sin\frac{\theta}{2} & e^{i\phi}\cos\frac{\theta}{2} & 0 & 0 \\ 0 & 0 & e^{-i\phi}\cos\frac{\theta}{2} & e^{i\alpha}\sin\frac{\theta}{2} \\ 0 & 0 & -e^{-i\alpha}\sin\frac{\theta}{2} & e^{i\phi}\cos\frac{\theta}{2} \end{pmatrix}$ Equation 4: $U_{ki} = \begin{pmatrix} 1 & 0 \\ 0 & 1 \end{pmatrix} \otimes \begin{pmatrix} e^{-i\phi}\cos\frac{\theta}{2} & e^{i\alpha}\sin\frac{\theta}{2} \\ -e^{-i\alpha}\sin\frac{\theta}{2} & e^{i\phi}\cos\frac{\theta}{2} \end{pmatrix} =$ $\begin{pmatrix} e^{-i\phi}\cos\frac{\theta}{2} & 0 & e^{i\alpha}\sin\frac{\theta}{2} & 0 \\ 0 & e^{-i\phi}\cos\frac{\theta}{2} & 0 & e^{i\alpha}\sin\frac{\theta}{2} \\ -e^{-i\alpha}\sin\frac{\theta}{2} & 0 & e^{i\phi}\cos\frac{\theta}{2} & 0 \\ 0 & -e^{-i\alpha}\sin\frac{\theta}{2} & 0 & e^{i\phi}\cos\frac{\theta}{2} \end{pmatrix}$ Each entangled pair of qubits is subject to a first unitary operation that transforms the first qubit in the pair and second unitary operation that transforms the second qubit in the pair. Accordingly, step 530 when implemented in a conventional computer requires 2N multiplications of 4×4 matrices by 4-component vector. The number of multiplications required thus scales as O(N). More specifically, the number of multiplications scales as O(n) for the game of FIG. 3 or $O(n^2)$ or $O(n \log n)$ for the game of FIG. 4 when the probability of qubits being entangled is 1 or (log n)/n. The computational complexity of the simulation is thus much less than the n-qubit entangled quantum game, where the required number of multiplications scale exponentially (i.e., $O(n2^n)$).

Step 540 evaluates the 4N-component final state vector after the application of operators in step 530 and can implement any desired joint operation J' and any desired rule to determine results for the players.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A method for allocating contributions toward a cooperative effort, the method comprising:
   constructing a state vector representing a plurality of pairs of entangled qubits, wherein the plurality of pairs of entangled qubits consists of N pairs;
   selecting 2N operators to be respectively applied to the 2N qubits, wherein selecting the 2N operators includes each of a plurality of players selecting one or more of the 2N operators for a set of the qubits assigned to the player, wherein the plurality of players consists of n players, N is equal to a product of n(n−1) and a probability p, the probability p is less than 1, and the operators are selected by each player according to a choice of the player regarding the cooperative effort;
   applying each of the 2N operators only to a portion of the state vector that represents the qubit corresponding to the operator;
   evaluating a final state vector that results from the application of the 2N operators to thereby assign respective results to the players; and
   the players contributing according to the results respectively assigned, the results designating whether respective players will cooperate in or defect from the cooperative effort.

2. The method of claim 1, wherein the probability p is equal to log(n)/n.

3. The method of claim 1, wherein software executed in a classical computer performs the step of applying the operators to the state vector.

4. The method of claim 1, wherein constructing the state vector comprises setting a system in a quantum state corresponding to the state vector.

5. The method of claim 4, wherein the system comprises 2N photons.

6. The method of claim 5, wherein the system is selected from a group consisting of SQUIDs, NMR systems, individual atoms, individual molecules, individual ions, cavity quantum electro-dynamic (QED) systems; and photonic systems having quantum states implementing the qubits.

7. The method of claim 1, wherein n is at least three.

8. A system comprising:
   a source of multiple channels of entangled photon pairs;
   a plurality of stations, where each station is associated with a plurality of the channels and is capable of performing a player-selected operation on states of photons associated with the station;
   a first optical network that for each channel and each entangled photon pair in the channel, delivers a first photon from the entangled photon pair to a first of the stations associated with the channel and delivers a second photon from the entangled photon pair to a second of the stations associated with the channel; and
   a measurement system coupled to measure the states of the photons after delivery to the stations.

9. The system of claim 8, wherein in each of the entangled photon pairs, a first polarization state of the first photon depends on a second polarization state of the second photon.

10. The system of claim 9, the player-selected operations of the stations change polarizations states of the photons.

11. The system of claim 10, wherein each station comprises:
   a polarizing beam splitter;
   a first polarization changing element in a path of a first polarization component exiting the polarizing beam splitter; and
   a second polarization changing element in a path of a second polarization component exiting the polarizing beam splitter.

12. The system of claim 8, wherein each system consists of linear optics.

13. The system of claim 8, wherein each of the stations is associated with two of the channels.

14. The system of claim 8, wherein the plurality of stations comprises n stations, wherein each station is associated with n−1 of the channels.

15. The system of claim 8, wherein:
   the stations comprise n stations; and
   the channels comprise p·n(n−1) channels for a probability p less than 1.

16. The system of claim 15, wherein the probability p is equal to log(n)/n.

17. The system of claim 8, wherein the source of multiple channels of qubits comprises one or more correlated semiconductor light sources.

18. The system of claim 8, wherein the source of multiple channels of qubits comprises:
   a laser; and
   a parametric down-converter capable of converting a photon from the laser into a pair of photons in an entangled state.

19. The system of claim 8, wherein the source of multiple channels of qubits comprises:
   a source of unentangled photons; and
   a system that creates entanglements between photons in different channels.

20. The system of claim 8, wherein the measurement system comprises an optical system implementing a joint operation on the entangled photon pairs.

21. The system of claim 20, wherein the optical system unentangles the entangled photon pairs.

22. The system of claim 20, wherein the optical system comprises a controlled NOT gate.

23. The system of claim 8, wherein the plurality of stations comprises at least three stations.

* * * * *

UNITED STATES PATENT AND TRADEMARK OFFICE
CERTIFICATE OF CORRECTION

PATENT NO. : 7,310,623 B2
APPLICATION NO. : 10/734713
DATED : December 18, 2007
INVENTOR(S) : Raymond G. Beausoleil et al.

It is certified that error appears in the above-identified patent and that said Letters Patent is hereby corrected as shown below:

In column 3, line 64, after "$U_1$" delete " $\hat{X}$ " and insert -- $\otimes$ --, therefor.

In column 3, line 64, before "$U_n$" delete " $\hat{X}$ " and insert -- $\otimes$ --, therefor.

In column 3, line 65, after "$U_1$" delete " $\hat{X}$ " and insert -- $\otimes$ --, therefor.

In column 3, line 66, before "$U_n$" delete " $\hat{X}$ " and insert -- $\otimes$ --, therefor.

In column 4, line 65, after "250." delete "p".

In column 5, line 4, before "$|0>_2$" delete "+" and insert -- x --, therefor.

In column 7, line 2, after "state" delete "$|>_1$" and insert -- $|0>_1$ --, therefor.

In column 9, line 65, delete "+" and insert -- x --, therefor.

Signed and Sealed this

Fourteenth Day of July, 2009

JOHN DOLL
*Acting Director of the United States Patent and Trademark Office*